(12) United States Patent
Pak et al.

(10) Patent No.: US 7,409,336 B2
(45) Date of Patent: Aug. 5, 2008

(54) METHOD AND SYSTEM FOR SEARCHING DATA BASED ON IDENTIFIED SUBSET OF CATEGORIES AND RELEVANCE-SCORED TEXT REPRESENTATION-CATEGORY COMBINATIONS

(75) Inventors: Wai H. Pak, Hercules, CA (US); Sia Henry Saputra, San Mateo, CA (US); Yunfei Zhang, Foster City, CA (US); Marc Alexander Caltabiano, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 319 days.

(21) Appl. No.: 10/465,338

(22) Filed: Jun. 19, 2003

(65) Prior Publication Data

US 2004/0260534 A1  Dec. 23, 2004

(51) Int. Cl.
  *G06F 17/27* (2006.01)
  *G06F 17/03* (2006.01)
  *G06F 17/21* (2006.01)
(52) U.S. Cl. .................. 704/9; 704/10; 707/1
(58) Field of Classification Search .......... 704/9, 704/7, 10, 8; 707/1
  See application file for complete search history.

(56) References Cited

U.S. PATENT DOCUMENTS

| | | | |
|---|---|---|---|
| 5,963,940 A | 10/1999 | Liddy et al. ............ | 707/5 |
| 6,182,066 B1 | 1/2001 | Marques ................ | 707/5 |
| 6,208,988 B1 * | 3/2001 | Schultz ................. | 707/5 |
| 6,327,593 B1 * | 12/2001 | Goiffon ................ | 707/102 |
| 6,502,091 B1 | 12/2002 | Chundi et al. ......... | 707/3 |
| 6,510,406 B1 * | 1/2003 | Marchisio ............. | 704/9 |
| 6,513,031 B1 * | 1/2003 | Fries et al. ........... | 707/3 |
| 6,725,217 B2 * | 4/2004 | Chow et al. ........... | 707/6 |
| 6,766,320 B1 * | 7/2004 | Wang et al. ........... | 704/9 |
| 6,772,149 B1 * | 8/2004 | Morelock et al. ...... | 707/6 |
| 6,910,003 B1 * | 6/2005 | Arnold et al. ......... | 704/4 |

(Continued)

FOREIGN PATENT DOCUMENTS

WO  WO 02/25479 A1  3/2002

OTHER PUBLICATIONS

*Banter RME: Proven Technology for understanding human communications* (visited Jan. 13, 2003) <http://www.banter.com/sol/so_banter/rme.shtm>.

(Continued)

*Primary Examiner*—Talivaldis I Smits
(74) *Attorney, Agent, or Firm*—Campbell Stephenson LLP

(57) ABSTRACT

A method and system for analyzing natural language text to identify a set of categories of data in a knowledge base associated with the natural language text and selecting a category from the set of categories is provided. The method and system further provides automatically providing a single category if the set of categories only contains the single category. The method and system also provides that each category in the knowledge base is associated with a stored text representation of a sample natural language text and a score for the text representation-category combination, wherein the score is representative of a relative relevance of the text representation-category combination. The method and system further provide for modifying the score associated with the text representation-category combination of a selected category using feedback provided upon the selection.

23 Claims, 8 Drawing Sheets

U.S. PATENT DOCUMENTS

| | | | |
|---|---|---|---|
| 7,039,625 B2* | 5/2006 | Kim et al. | 707/1 |
| 7,051,017 B2* | 5/2006 | Marchisio | 707/3 |
| 7,107,261 B2* | 9/2006 | Farrett | 707/3 |
| 7,181,438 B1* | 2/2007 | Szabo | 707/2 |
| 2001/0037328 A1* | 11/2001 | Pustejovsky et al. | 707/3 |
| 2001/0044720 A1* | 11/2001 | Lee et al. | 704/251 |
| 2002/0078044 A1 | 6/2002 | Song et al. | 707/6 |
| 2003/0172357 A1* | 9/2003 | Kao et al. | 715/529 |
| 2005/0102251 A1* | 5/2005 | Gillespie | 707/1 |

OTHER PUBLICATIONS

*Banter Solution—Email Productivity* (visited Apr. 2, 2003) <http://www.banter.com/sols/so_ep.shtm>.

*Banter Solution—Call Center Agent Assistance* (visited Apr. 2, 2003) <http://www.banter.com/sols/so_ccaa.shtm>.

*Banter Solution—Web Self-Service* (visited Apr. 2, 2003) <http://www.banter.com/sols/so_wss.shtm>.

*Banter Solution—Email Response Management* (visited Apr. 9, 2003) <http://www.banter.com/sols/so_eresponse.shtm>.

*Banter Server—Enterprise-Class Performance and Reliability* (visited May 6, 2003) <http://www.banter.com/sol/so_banter_server.shtm>.

*Banter Workbench* (visited May 6, 2003) <http://www.banter.com/sol/so_banter_workbench.shtm>.

*Banter Reply 4.5: automated response for CRM applications* (visited May 6, 2003) <http://www.banter.com/sol/so_banter_reply.shtm>.

Banter Inc., *White Paper: Natural Language Engines for Advanced Customer Interaction*, Rev. 3.0, 15 pages.

\* cited by examiner

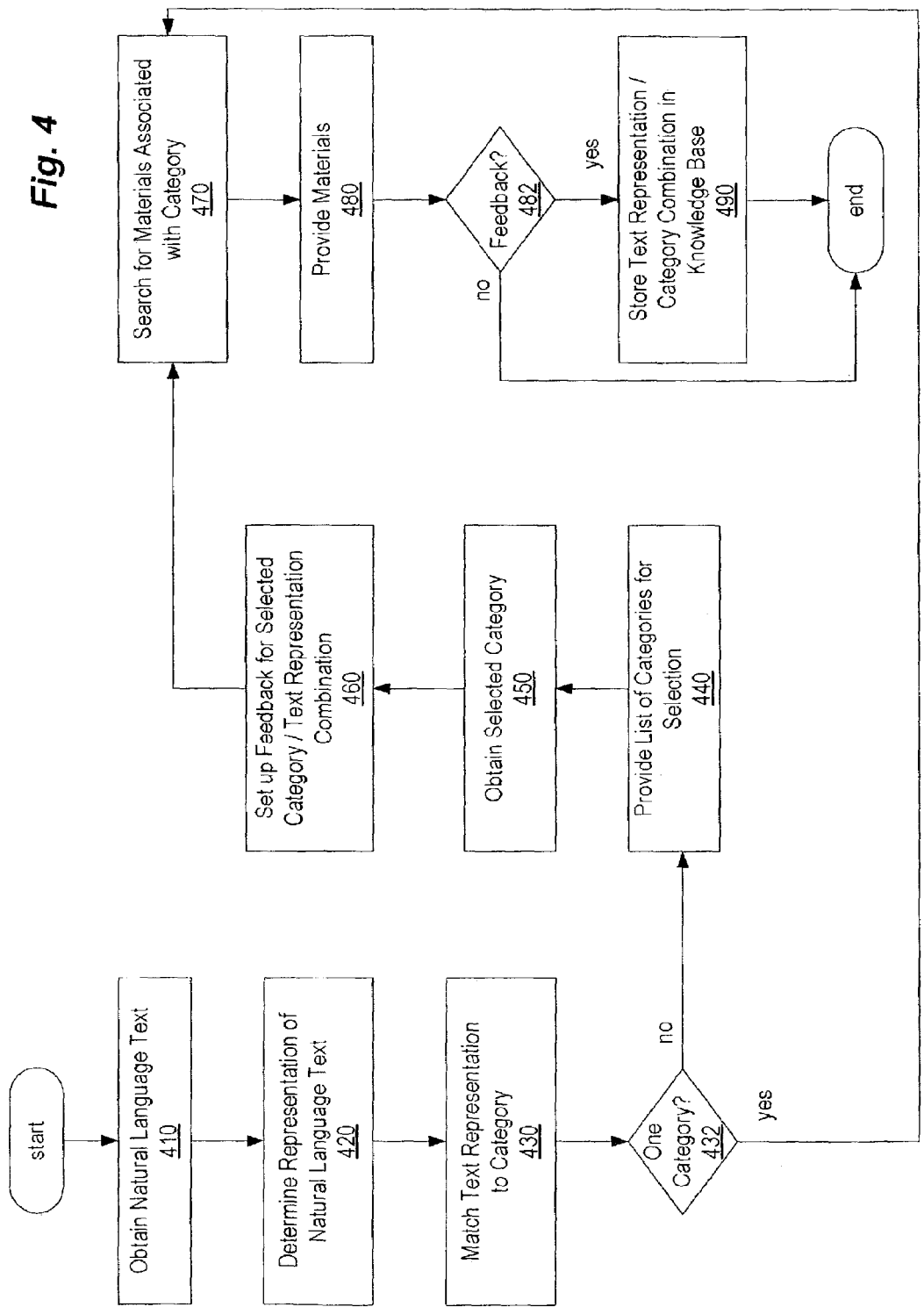

METHOD AND SYSTEM FOR SEARCHING DATA BASED ON IDENTIFIED SUBSET OF CATEGORIES AND RELEVANCE-SCORED TEXT REPRESENTATION-CATEGORY COMBINATIONS

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

This invention relates to searching for data and, more particularly, to analyzing a natural language message, determining a category in a knowledge base corresponding to the content of the message, and intelligently providing documents from the knowledge base category in response to the message.

2. Description of the Related Art

With the ubiquitous nature of the Internet, most people are familiar with searching for data using a search engine. On the Internet, a search engine is a coordinated set of programs that can include the following:

- A "spider" (also called a "crawler" or a "bot") that goes to every page or representative pages on Web sites designated as searchable and reads those pages, using hypertext links on each page to discover and read a site's other pages;
- A program that creates an index (sometimes called a "catalog") from the pages that have been read; and
- A program that receives a search request, compares the search request to the entries in the index, and returns results to the user.

The general concepts and problems encountered when searching for data are explained herein in the context of Internet searching by search engines, although the same concepts apply for searches performed on documents that are not web pages by other types of software, such as database searches by database management systems.

An alternative to using a search engine on the Internet is to explore a structured directory of topics. The Yahoo web site is a widely-used directory on the Web, although Yahoo also allows a user to use a search engine. A number of Web portal sites offer both the search engine and directory approaches to finding information.

Before a search engine can tell you where a file or document is, the file or document must be locatable. To find information on the hundreds of millions of Web pages that exist, a search engine employs spiders to build lists of the words found on Web sites. When a spider is building its lists, the process is called Web crawling. To build and maintain a useful list of words, a search engine's spider examines a very large number of web pages.

A spider typically begins with lists of heavily-used servers and very popular pages. The spider begins with a popular site, indexing the words on its pages and following every link found within the site. In this way, the spider quickly begins to travel, spreading out across the most widely used portions of the Web, to build an index.

Searching through an index involves a user building a query and submitting it through the search engine. The query can be quite simple, a single word at minimum. Building a more complex query requires the use of Boolean operators that allow the user to refine and extend the terms of the search.

The searches defined by Boolean operators, such as AND, OR, NOT, and so on, are literal searches—the search engine looks for the words or phrases exactly as they are entered. This characteristic can be a problem when the entered words have multiple meanings. "Bed," for example, can be a place to sleep, a place where flowers are planted, the storage space of a truck, or a place where fish lay their eggs. If the user is interested in only one of these meanings, the user might not want to see pages featuring all of the others. The user can build a literal search that tries to eliminate unwanted meanings, but it is preferable that the search engine assist with the elimination.

One of the areas of search engine research is concept-based searching. Some of this research involves using statistical analysis on pages containing the words or phrases in the search, in order to find other pages in which the user might be interested. The information stored about each page is greater for a concept-based search engine than for a keyword searching engine, and far more processing is required for each search. Still, many groups are working to improve both results and performance of this type of search engine. Others have moved on to another area of research, called natural language queries.

The idea behind natural language queries is that the user can type a question in the same way the user would ask the question to a human being; there is no need to keep track of Boolean operators or complex query structures. A popular natural language query web site today is AskJeeves.com, which parses the query for keywords that it then applies to the index of sites it has built. AskJeeves.com only works with simple queries; but competition is heavy to develop a natural-language query engine that can accept a query of great complexity.

All three of these types of search engines search for words in the index matching the words used in the search query. As mentioned above, even concept-based searching typically involves analysis of actual words in the result document and matches those word combinations to words in the search text. The analysis and searching in a context-based search is typically much slower and more expensive than keyword searching.

What is needed is a way to combine the advantages and capabilities of these different searching techniques. Preferably, the user should be able to enter his or her query in natural language text, rather than as a Boolean expression. The search engine should provide intelligence to search based on concepts, rather than solely based on words appearing in both the search query and the search result. In addition, the search engine should find documents quickly and present the results in order of perceived relevance to the search query.

SUMMARY OF THE INVENTION

The present invention provides searching functionality to search a variety of types of documents for material related to concepts expressed in a natural language text. The invention includes analyzing the natural language text to determine an underlying concept and identifying one or more categories of searchable material in a knowledge base that are related to the underlying concept. The invention includes intelligently providing documents from the knowledge base in these categories, both automatically and with the assistance of a customer service agent.

In one embodiment, a method includes analyzing natural language text to identify a set of categories of data in a knowledge base. When the set includes one category, the method further includes providing data associated with the category from the knowledge base. When the set includes more than one category, the method includes presenting the set of categories for selection of a category and providing data associated with the selected category from the knowledge base.

The method can further include associating the selected category with a representation, such as a statistical representation, of the natural language text in the knowledge base. The method can further include automatically sending a response to the natural language text or providing materials to an agent for inclusion in a response. The set of categories can be presented with a score for each category, with the score based upon how closely the category matches the concept expressed in the natural language text. Data in the knowledge base can include solutions, resolutions, and pre-defined answers, also referred to as templates. In one embodiment, a solution to a problem stated in the natural language text can be made available in multiple language-specific versions. Each solution is associated with one category, and each language-specific version of the solution is associated with that category.

In one embodiment, an application program interface includes an analyzing function to analyze natural language text to identify a set of categories of data in a knowledge base. The application programming interface further includes a providing function to provide data associated with a category from the knowledge base and a presenting function to present the set of categories for selection of a selected category. The application programming interface can further include an associating function to associate a given category with a representation of the natural language text.

Other embodiments of the invention include a system, computer system, and computer program product to provide the functionality of the methods described above.

BRIEF DESCRIPTION OF THE DRAWINGS

The present invention may be better understood, and its numerous objectives, features and advantages made apparent to those skilled in the art by referencing the accompanying drawings.

FIG. 4 shows a flowchart for processing a natural language text in one embodiment of the invention.

The use of the same reference symbols in different drawings indicates similar or identical items.

DETAILED DESCRIPTION

Figure 1:
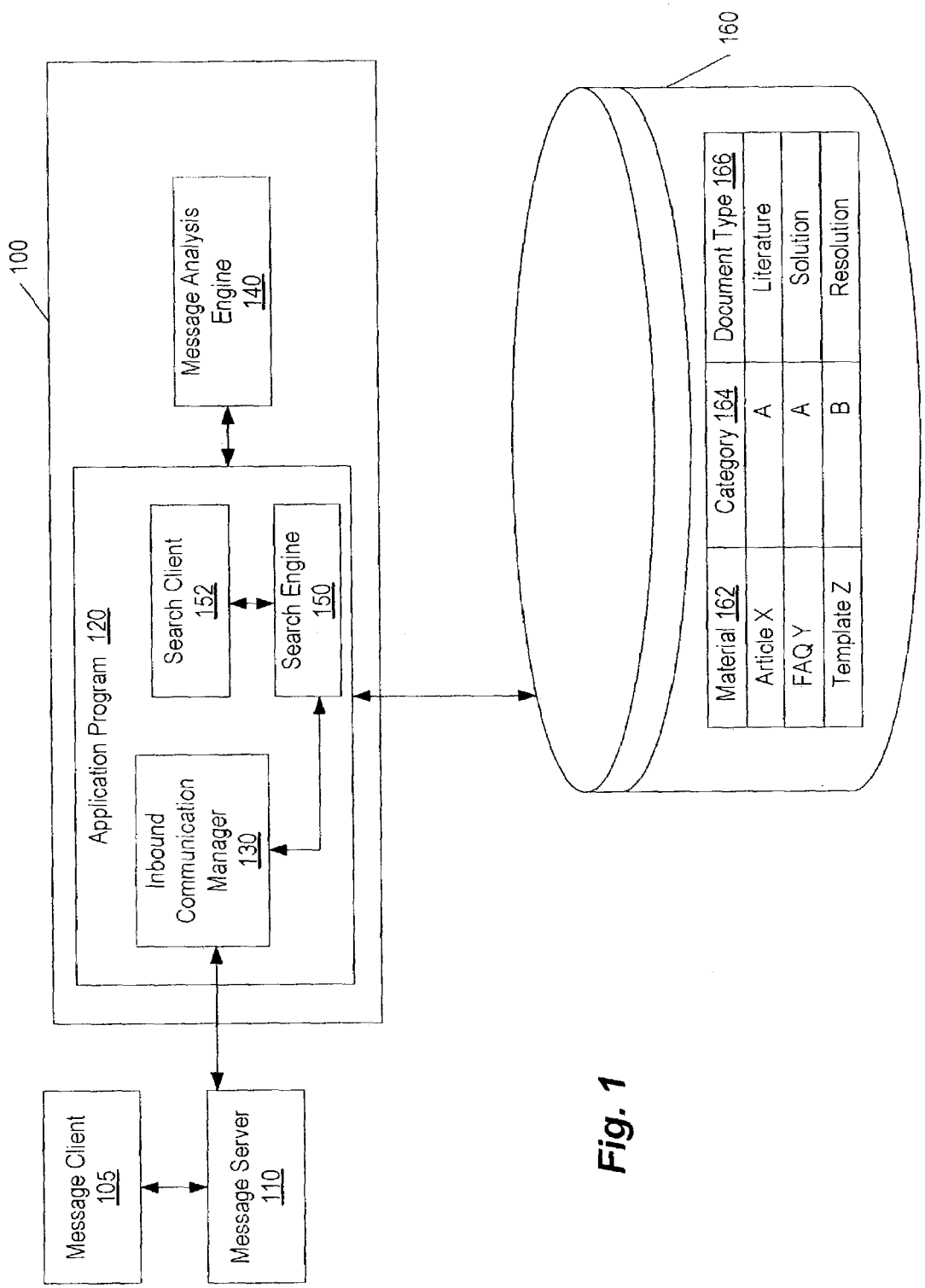
FIG. 1 shows an example of an embodiment of the invention having the capability to obtain natural language text from queries generated within an application program as well as from external message sources.

For a thorough understanding of the subject invention, refer to the following Detailed Description, including the appended claims, in connection with the above-described Drawings.

References in the specification to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

Introduction

The present invention provides a method, system, computer system, computer program product, and application programming interface for searching a variety of types of documents for material related to concepts expressed in a natural language text. The invention includes analyzing the natural language text to determine an underlying concept and identifying one or more categories of searchable material in a knowledge base that are related to the underlying concept. The invention includes intelligently providing documents from the knowledge base in these categories, both automatically and with the assistance of a customer service agent, also referred to herein as a "call center agent."

An example usage scenario includes a call center agent at Company A receiving a call from a user who is experiencing a new problem that the user can't solve internally. The call center agent can enter information about the problem into a "service request" form and then use an intelligent search engine such as that provided by the present invention to search for potential solutions to the problem. In one embodiment of the invention, when an agent begins to prepare a response corresponding to a service request, a searching user interface opens with information about the problem, automatically populates information from the service request, and sends text associated with the service request to a message analysis engine and search engine. The searching user interface can display a list of categories from which the call center agent can search for documents. In one embodiment, the intelligent search engine may provide a number of possible solutions and allow the call center agent to preview solutions, see further detail about a given solution, and, if the call center agent finds the best solution, attach the solution document to the response to the customer's service request. In one embodiment, a call center agent can also browse a catalog of categories in a hierarchical view and associate a document, such as a Solution or Response Template, with a category.

Another example of a usage scenario is an administrator for Company B for the intelligent search engine described above. Company B is now releasing a new product, and the administrator determines that new categories should be used to categorize materials related to the new product. The administrator adds those new categories and trains the intelligent search engine by associating the new categories with materials containing responses to frequently asked questions (FAQs) expected to be related to the new product. In one embodiment, an administrative interface enables an administrator to create, delete, import, and export both categories and catalogs of categories. Furthermore, the administrator can place materials into categories as well as train the intelligent search engine to associate a representation of a natural language text with a given category. For example, a statistical representation of the natural language text can be developed by a message analysis component of the intelligent search engine and associated with the given category.

FIG. 1 shows an example of embodiment of the invention having the capability to obtain natural language text from queries generated within an application program as well as from external message sources. System 100 provides an intelligent search engine for finding information related to a concept presented in a natural language text. The natural language text can be contained in a natural language query generated by a search client within an application program, as described below with reference to FIGS. 2A and 3A. Alternatively, the natural language text can be contained in a message received by an application program from an external message source, as described below with reference to FIGS. 2B and 3B. Alternatively, the natural language text can be generated by other components (not shown) within an application program; for example, an application program may concatenate values of data fields processed and provide the concatenated text as natural language text to be analyzed. Other ways of obtaining the natural language text are within the scope of the invention as well.

The embodiment of system 100 shown in FIG. 1 includes capabilities to obtain natural language text from either queries generated within an application program or from an external message source. It is not a requirement of the invention that the natural language text be generated by any particular source, whether internal or external to system 100. In FIG. 1, an embodiment of system 100 is shown as being in communication with an external message server 110, which receives messages from an external message client 105. In other embodiments, the functionality of external message server 110 and external message client 105 can be included in system 100. System 100 includes application program 120 and message analysis engine 140. Application program 120 can interact with a user, which can be a person and/or another program (not shown). In the embodiment shown, application program 120 includes inbound communication manager 130, which communicates with external message server 110, search engine 150, and search client 152. Search engine 152 also generates natural language text queries that can be analyzed by message analysis engine 140. In other embodiments, the functionality provided by message analysis engine 140 can be included within application program 120, inbound communication manager 130 can be external to application program 120, and/or search engine 150 and search client 152 can be either external to application program 120 or included within message analysis engine 140.

Application program 120 is in communication with knowledge base 160, which includes data that can be included in a search result provided by search engine 150. Knowledge base 160 is not limited to any particular type of knowledge base, database, or other implementation. Knowledge base 160 can be considered to represent generally any collection of data organized according to categories of knowledge. Example data are shown in FIG. 1, including three records for materials residing in knowledge base 160. The material 162 field included in the records shown includes an article X, a solution to a frequently asked question (FAQ) Y, and a pre-formulated resolution for a given problem, called a template, here template Z. Article X and FAQ Y have a category 164 value of 'A,' and template Z has a category 164 value of 'B.' Article X has a document type 166 value of 'literature,' FAQ Y has a document type 166 value of 'solution,' and template Z has a document type 166 value of 'resolution.'

In one embodiment of the invention, an administrator can load a set of materials into knowledge base 160 and assign a value for category 164 and a value for document type 166 for each material. The administrator can create a new category 164 values and "train" message analysis engine 140 to recognize characteristics of natural language text corresponding to each category 164 value. In one embodiment, changes such as adding materials, categories, and document types and forming relationships between them can be made by adding respective values and/or records to database 160. These changes can be made without changing application program 120 or any components included within application program 120. In some situations, data can be added to or changed within database 160 dynamically, without stopping execution of application program 120, inbound communication manager 130, search engine 150, or search client 152.

For example, it may be helpful for a customer support agent receiving a service request for help with a user's problem to search other service requests for similar problem reports. Assume that a new document type 166 is to be added to database 160 having the value "Service Request." An example scenario for implementing such a change includes adding a new value of "Service Request" to a document type table (not shown). In addition, a material 162 having a value identifying a "Search Request #100" with a category 164 value of "A" can be associated with the document type 166 value of "Search Request."

In one embodiment, the functionality provided by search engine 150 can be selected as a 'search option' implemented by search client 152 from within application program 120, such as a call center application program. For example, the searching functionality may be invoked by pressing a button in a user interface for application program 120, wherein the button in the user interface is represented by search client 152. Pressing the button invokes a searching business service, implemented by search engine 150. In this embodiment, the user of application program 120 can search for documents related to the concept expressed in the original message or query and view those documents from within application program 120.

In one embodiment, application program 120 and search engine 150 are integrated to share data. By sharing data, application program 120 and search engine 150 enable users to see materials from various business components related to application program 120, such as Solutions, Literature, and Resolution Documents, as search results. Each business component may be included in database 160 as a document type or other type of object. As mentioned above, new document types or other types of objects can be added and relationships with other objects, such as documents, made without changing the implementation of application program 120 or any components included within application program 120. Data can be populated from application program 120 and used to build a natural language text for which a matching category is to be obtained.

In one embodiment, a commercially-available product serves as the core "classification engine" in message analysis engine 140. This commercially-available classification engine is Banter Relationship Modeling Engine (RME), provided by Banter, Inc. of San Francisco, Calif. Banter RME uses a knowledge base file of categories, category relationships, and a statistical model that represents each category as it relates to the entire set of categories. This statistical model is used when natural language text from an original message or query is sent to the classification engine to find the most relevant categories. While this particular commercially-available product is used in this embodiment, any program that can derive a concept expressed in natural language text and use that concept to determine related categories of information in a knowledge base can be used to provide the functionality of message analysis engine 140.

The model that represents categories inside a knowledge base, such as knowledge base 160, can be built by providing representative sample text for each category in the knowledge base. The model can be either a statistical model or a rule-based model. In one embodiment, knowledge base 160 is loaded by sending sample texts for all categories at one time to knowledge base 160. Rather than storing the natural language text itself in knowledge base 160, each sample text is analyzed to determine a text representation for the sample text, and that text representation is associated with at least one related category in knowledge base 160. Message analysis engine 140 builds the base model that defines knowledge base 160 from text representations for the sample text. In one embodiment, the model includes calculating a score for a given category/text representation combination, where the score indicates the relative relevance of the category to the concept represented by the text representation.

Once a base model is built for a knowledge base and is deployed, automated learning can be applied for categories based on actual usage of the knowledge base. Learning takes the form of positive or negative feedback for a text representation/category combination. This feedback is used to modify the base model to add to the set of acceptable combinations or eliminate combinations that should not be associated. In one embodiment, a user can provide feedback to the message analysis engine 140 for a particular knowledge base, such as knowledge base 160. The score for a given category/text representation combination is not required and is not limited to a particular implementation. The score can be calculated by a trained statistical or rule-based model based upon feedback, assigned by an algorithm developed specifically for a particular application environment, and/or manually assigned or adjusted by an administrator when new content is introduced and/or modified in the knowledge base.

In one embodiment, multiple application programs and/or multiple instances of a single application program can share a given knowledge base. Providing feedback from different sources to a single knowledge base helps ensure the accuracy of categories associated with a given text representation of a natural language text. Furthermore, multiple instances of a search engine, such as search engine 150, can be running for different application programs and/or for different instances of a single application program. It is within the scope of the invention that feedback can be provided to different instances of search engine 150.

Feedback can be performed as a separate, asynchronous process from the process of receiving and providing a search result and/or message response for a given natural language text. Feedback related to the associated category/text representation for that given natural language text can be provided to the specific instance of search engine 150 that originally processed that natural language text. A selected category can be compared with a category generated by that particular instance of search engine 150 to determine whether feedback is necessary. This feedback enables, for example, the selected category for the natural language text to be properly associated with the correct text representation of the natural language text.

In the following descriptions of FIGS. 2A through 3C, either search client 152 and inbound communication manager 130 is shown, but not both, depending upon the particular data flows involved. As mentioned previously, it is not a requirement that application program 120 include components such as inbound communication manager 130 and search client 152. If application program 120 does include both inbound communication manager 130 and search client 152, one of skill in the art will recognize that inbound communication manager 130 can operate simultaneously with search client 152 in obtaining and processing natural language texts.

Figure 2A:
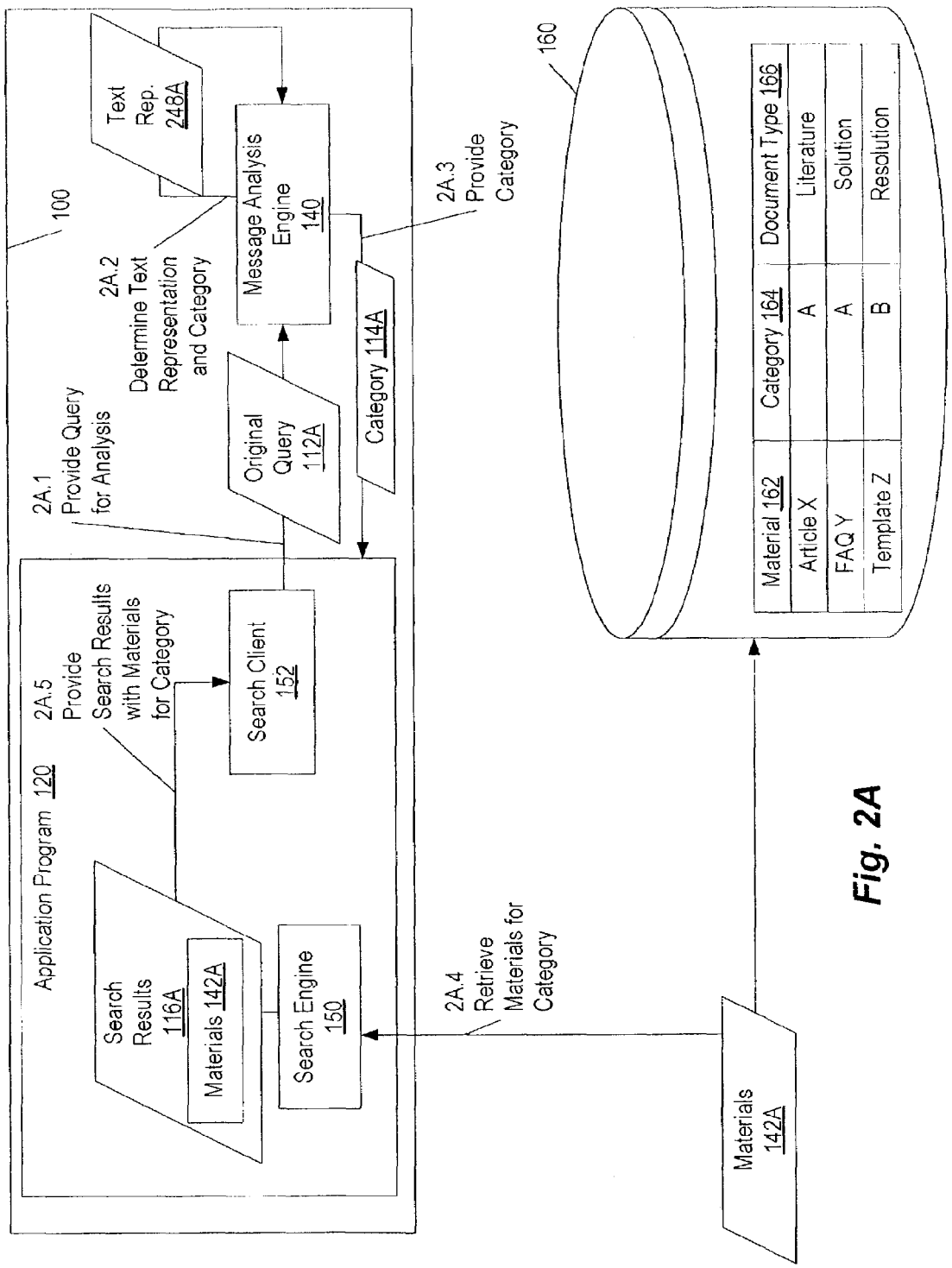
FIG. 2A shows an example process of obtaining a query, analyzing natural language text in the query, determining a category associated with a concept expressed in the natural language text, and providing search results including materials associated with the category.

FIG. 2A shows an example process of obtaining a query, analyzing natural language text in the query, determining a category associated with a concept expressed in the natural language text, and providing search results including materials associated with the category. In FIG. 2A, search client 152 obtains and processes the natural language text.

In action 2A.1, search client 152 obtains and provides original query 112BA to message analysis engine 140. In action 2A.2, message analysis engine 140 analyzes original query 112A and determines both a text representation of the natural language text included in the message, shown as text representation 248A, and a category 114A associated with natural language text. The analysis does not include searching for keywords in the message, but rather examining the message's natural language text to intelligently determine a concept expressed by the message. The content of the message, represented by text representation 248A, is then used to identify a category of related data in knowledge base 160, in this case category 114A. In one embodiment, message analysis engine 140 loads all available categories into memory upon startup, but it is within the scope of the invention for message analysis engine 140 to retrieve the available categories from knowledge base 160.

In action 2A.3, message analysis engine 140 provides category 114A determined from the natural language text to application program 120. In action 2A.4, search engine 150 retrieves materials 142A associated with category 114A from knowledge base 160. In action 2A.5, search engine 150 provides search results 116A including materials 142A to search client 152. Search client 152 can provide the search results 116A and materials 142A to a user of application program 120 directly, or search client 152 can provide the search results 116A and materials 142 to a component of application program 120 that further processes them before providing search results to a user of application program 120.

Figure 2B:
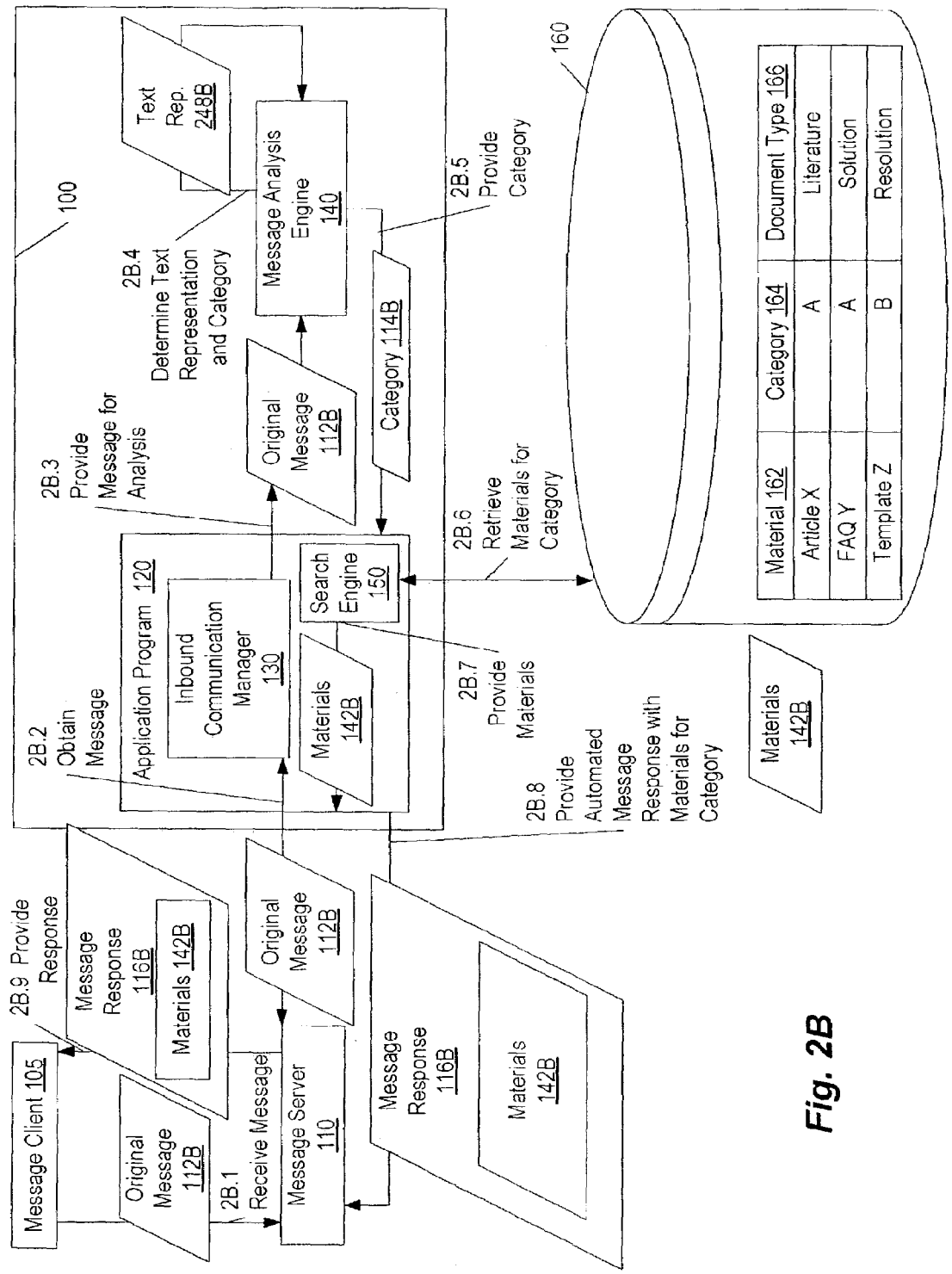
FIG. 2B shows an example process of obtaining a message from an external message source, analyzing natural language text in the message, determining a category associated with a concept expressed in the natural language text, and providing a response to the message including materials associated with the category.

FIG. 2B shows an example process of obtaining a message from an external message source, analyzing natural language text in the message, determining a category associated with a concept expressed in the natural language text, and providing a response to the message including materials associated with the category.

In FIG. 2B, inbound communication manager 130 obtains and processes the natural language text. In action 2B.1, original message 112B is received by message server 110 from message client 105. In action 2B.2, inbound communication manager 130 obtains original message 112B from message server 110. In one embodiment, inbound communication manager 130 operates in conjunction with a channel driver (not shown) communicating via a communication application programming interface (API), also not shown. The channel driver listens to the message channel and detects messages arriving at a given message server. This channel driver provides information about incoming messages to inbound communication manager 130 and is described in further detail in U.S. patent application Ser. No. 09/823,835, filed on Mar. 31, 2001, entitled "Multi-Channel Media Independent Server" and naming Mingte Chen, Anil K. Annadata, and Leon Chan as inventors, the application being incorporated herein by reference in its entirety.

In action 2B.3, application program 120 obtains original message 112B from inbound communication manager 130 and provides original message 112B to message analysis engine 140. In action 2B.4, message analysis engine 140 analyzes original message 112B and determines both a text representation of the natural language text included in the message, represented as text representation 248B, and a category 114B associated with natural language text. The content of the message, as represented by text representation 248B, is then used to identify a category of related data in knowledge base 160, in this case category 114B.

In action 2B.5, message analysis engine 140 provides category 114B determined from the natural language text to application program 120. In action 2B.6, search engine 150 retrieves materials 142B associated with category 114B from knowledge base 160. In action 2B.7, rather than providing search results directly to the user via search client 152, search engine 150 provides materials 142B to application program 120. In action 2B.8, application program 120 generates and provides an automated message response 116B including materials 142B to message server 110. The automated message response 116B may be the result of further processing of the search results, materials 142B, provided by search engine 150. Message server 110 provides message response 116B and materials 142B to message client 105 in action 2B.9, which may, in turn, provide message response 116B and materials 142B to a user.

Figure 3A:
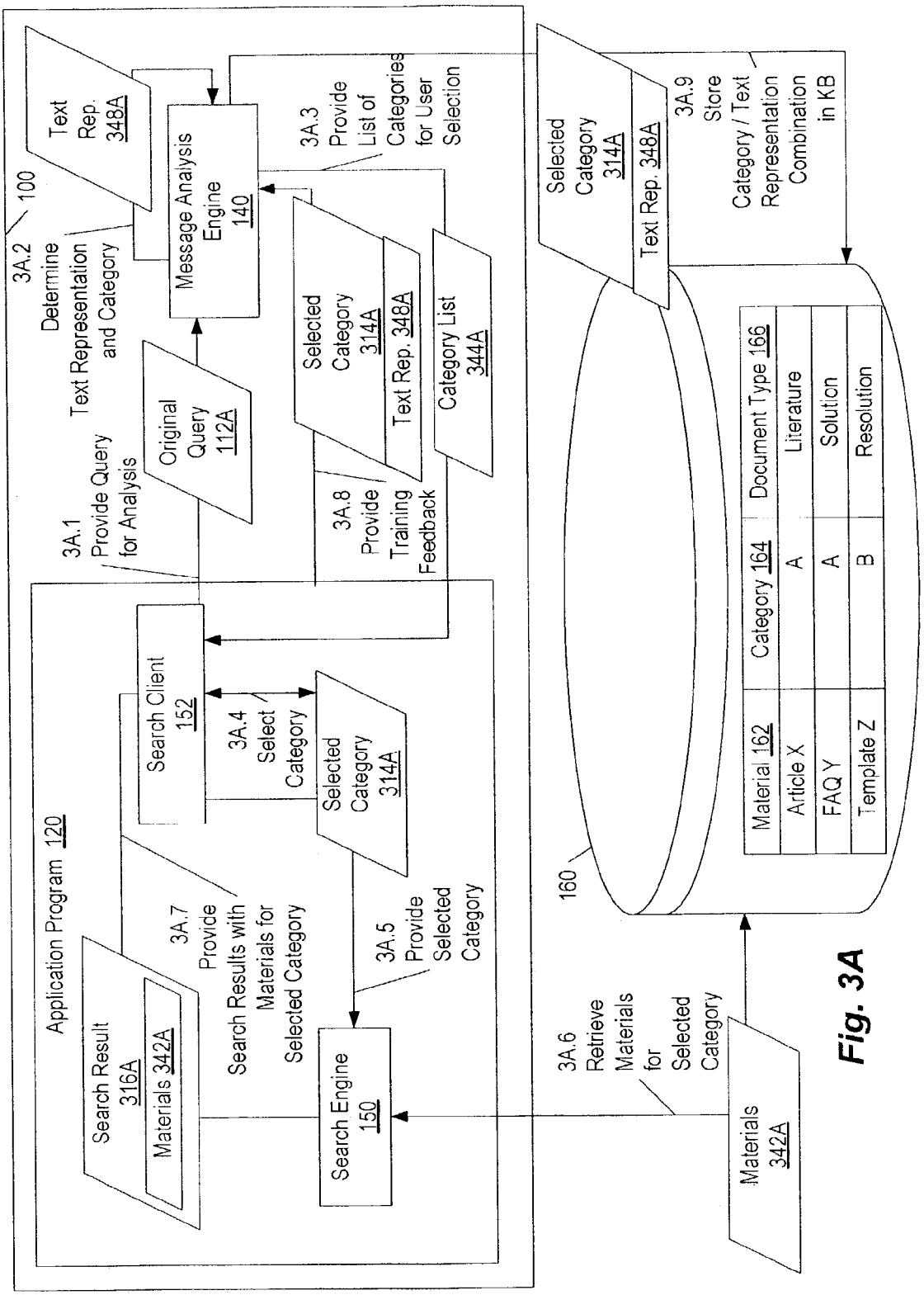
FIG. 3A shows an example process of obtaining a query, analyzing natural language text in the query, providing a list of categories associated with a concept expressed in the natural language text for user selection, providing search results including materials in the selected category, and storing information about a combination of the selected category and a representation of the text in a knowledge base.

FIG. 3A shows an example process of obtaining a query, analyzing natural language text in the query, providing a list of categories associated with a concept expressed in the natural language text for user selection, providing search results including materials in the selected category, and storing information about a combination of the selected category and a representation of the text in a knowledge base. In FIG. 3A, search client 152 obtains and processes the natural language text.

Determining whether to provide feedback is a process that can be performed by search engine 150, application program 120, a user of application program 120, and/or a user of search client 152. In one embodiment, the determination is made asynchronously, i.e., after search results and/or a message response have been provided to a user. In other embodiments, feedback may be provided in conjunction with providing the search results and/or message response.

In action 3A.1, search client 152 within application program 120 obtains and provides original query 112A to message analysis engine 140. In action 3A.2, message analysis engine 140 analyzes original query 112A and attempts to determine a text representation 348A of the natural language text and an associated category of information in knowledge base 160. If no category can be determined from text representation 348A, in action 3A.3, message analysis engine 140 provides a list of possibly relevant categories 344A to search client 152. Note that, in an alternative scenario, the list of possibly relevant categories 344A could be instead provided to application program 120. As mentioned previously, message analysis engine 140 may obtain the list of categories from memory or from knowledge base 160.

In action 3A.4, a user of search client 152 selects a category most closely matching the concept conveyed by original query 112A, in this case, selected category 314A. The interface for selecting a category may be provided by, for example, search client 152 or another component of application program 120. In action 3A.5, application program 120 provides selected category 150 to search engine 150. In action 3A.6, search engine 150 retrieves materials 342A associated with selected category 314A from knowledge base 160. In action 3A.7, search engine 150 provides search results 316A including materials 342A to search client 152. Note that search client 152 may then provide the search results 316A and materials 342A to a user of search client 152.

A determination is made that feedback should be provided to knowledge base 160. In action 3A.8, application program 120 provides training feedback, including selected category 314A and text representation 348A, to message analysis engine 140. Message analysis engine 140 can then cause an association to be stored in knowledge base 160 between selected category 314A and text representation 348A, as shown in action 3A.9. System 100 has been "trained" to recognize that association. In one embodiment, feedback can be provided automatically by application program 120. In other embodiments, feedback can be provided by the user of application program 120 and/or search client 152. Furthermore, feedback can be provided either with the search results and/or message response or asynchronously.

Figure 3B:
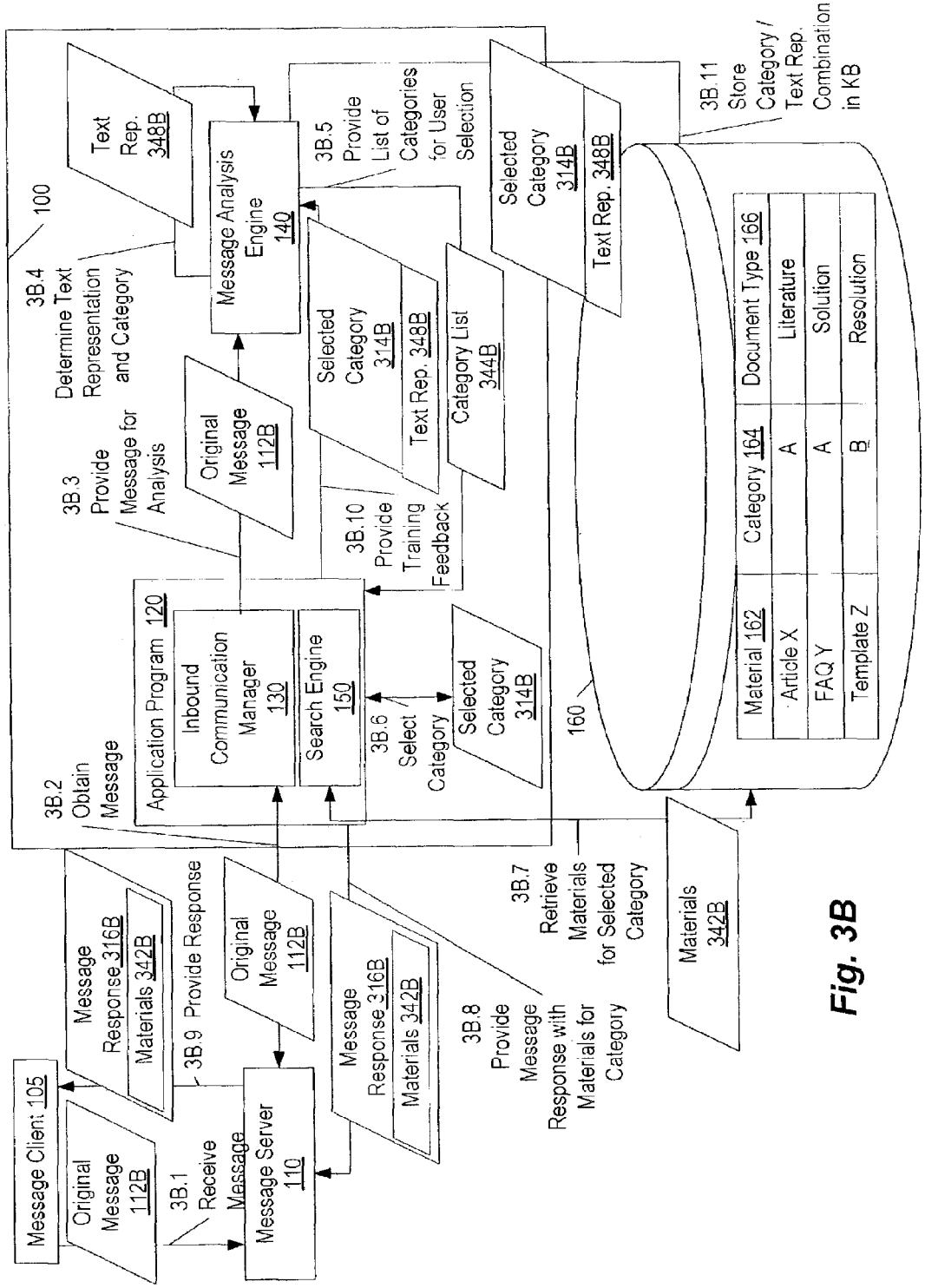
FIG. 3B shows an example process of obtaining a message from an external message source, analyzing natural language text in the message, providing a list of categories associated with a concept expressed in the natural language text for user selection, providing a response including materials in the selected category, and storing information about a combination of the selected category and a representation of the text in a knowledge base.

FIG. 3B shows an example process of obtaining a message from an external message source, analyzing natural language text in the message, providing a list of categories associated with a concept expressed in the natural language text for user selection, providing a response including materials in the selected category, and storing information about a combination of the selected category and a representation of the text in a knowledge base. In FIG. 3B, inbound communication manager 130 obtains and processes the natural language text. Actions 3B.1 through 3B.3 are similar to actions 2B.1 through 2B.3 of FIG. 2B. In action 3B.1, original message 112B is received by message server 110 from message client 105. In action 3B.2, inbound communication manager 130 obtains original message 112B from message server 110. In action 3B.3, application program 120 obtains original message 112B from inbound communication manager 130 and provides original message 112B to message analysis engine 140.

In action 3B.4, message analysis engine 140 analyzes original message 112B and attempts to determine a text representation 348B of the natural language text and an associated category of information in knowledge base 160. If no category can be determined from text representation 348B, in action 3B.5, message analysis engine 140 provides a list of possibly relevant categories 344B to application program 120. As mentioned previously, message analysis engine 140 may obtain the list of categories from memory or from knowledge base 160. In action 3B.6, a user of application program 120 selects a category most closely matching the concept conveyed by original message 112B, in this case, selected category 314B. In action 3B.7, search engine 150 retrieves materials 342B associated with selected category 3114B from knowledge base 160.

In action 3B.8, application program 120 provides a message response 316B including materials 342B to message server 110, which provides message response 316B to message client 105 in action 3B.9. Note that message response 316B can be the result of additional processing by application program 120 of selected category 314B and/or materials 342B.

In action 3B.10, application program 120 provides training feedback, including selected category 314B and text representation 348B, to message analysis engine 140. Message analysis engine 140 can then cause an association to be stored in knowledge base 160 between selected category 314B and text representation 348B, as shown in action 3B.11, and system 100 has been "trained" to recognize that association.

FIG. 4 is a flowchart for processing a natural language text in accordance with one embodiment of the invention. In "Obtain Natural Language Text" step 410, natural language text to be analyzed is obtained. The natural language text can be, for example, extracted from the body of an e-mail message or constructed as a set of strings of data processed by an application program. In "Determine Representation of Natural Language Text" step 420, a representation of the natural language text is determined for matching against categories in a knowledge base. This representation can be, for example, a statistical representation of the contents of the natural language text as determined by message analysis engine 140 of FIGS. 1 through 3B. In "Match Text Representation to Category" step 430, a knowledge base is searched to find one or more categories related to the underlying concept communicated in the natural language text.

At "One Category" decision point 432, a determination is made whether the result of "Match Text Representation to Category" step 430 produced one or more categories. If only one category was produced, control proceeds to "Search for Materials Associated with Category" step 470. If more than one category was produced, control proceeds to "Provide List of Categories for Selection" step 440.

At "Provide List of Categories for Selection" step 440, a list of categories possibly related to the concept expressed by the natural language text is presented to a user, such as a customer service agent or another program. In "Obtain Selected Category" step 450, a category selected by the user is obtained. In "Set up Feedback for Selected Category/Text Representation Combination" step 460, feedback is established to be immediately provided to train the underlying knowledge base. In another embodiment, "Set up Feedback for Selected Category/Text Representation Combination" step 460 can be performed asynchronously after a determination is made in "Feedback?" decision point 482, and the category and text representation combination can be determined at that time. Control proceeds from "Set up Feedback for Selected Category/Text Representation Combination" step 460 to "Search for Materials Associated with Category" step 470.

At "Search for Materials Associated with Category" step 470, either the one category determined at "Match Text Representation to Category" step 430 or the selected category obtained in "Obtain Selected Category" step 450 is used to search the knowledge base for materials associated with the category. Control proceeds to "Provide Materials" step 480, where the materials found in the knowledge base are provided. For example, if the natural language text was contained in a message, a response to the message can be sent providing the materials. If the natural language text was provided in application program 120 to be used as a search string, search results containing the materials can be provided.

From "Provide Materials" step 480, control proceeds to "Feedback" decision point 482. Feedback can be provided when a category is selected by a user as in "Obtain Selected Category" step 450, or in one embodiment, the user can choose to provide feedback. If feedback is not to be presented, processing of the natural language text ends. If feedback is to be presented, control proceeds from "Feedback" decision point 482 to "Store Text Representation/ Category Combination in Knowledge Base" step 490. A representation of the text, such as a statistical representation, and the corresponding category are stored in the knowledge base so that other natural language texts having similar characteristics can be associated with the category.

In one embodiment, administrators can specify which materials (also referred to as 'content objects') are available for searching and displaying by the knowledge base search engine, such as search engine 150 of FIG. 1. In one embodiment, search engine 150 provides a "catalog" of searchable documents. A catalog corresponds to groupings of categories structured in a hierarchy. An administrator specifies searchable materials by selecting one or more content objects at the catalog level. Only records of these content object types are returned as search results.

Catalogs can be used for providing information about products, for browsing materials associated with the category, and so on. In one embodiment, a catalog has a one-to-one correspondence with a knowledge base of searchable documents. Multiple knowledge bases and catalogs can be used for different types of searchable documents and/or for access by users having different access rights.

In one embodiment, categories correspond to nodes in the catalog that are associated with materials related to one or more business components. Examples of business components include a potential business opportunity, an account with an existing customer, and so on. A given business component may be classified in a single parent category and/or in multiple child categories. In one embodiment, a category in the catalog has a one-to-one correspondence to a category in a knowledge base In one embodiment, users can be grouped together into user groups, which are associated with categories. User groups defined by the application program 120 of FIG. 1 can be used to restrict access to data presented by the intelligent search engine. A user can browse material in categories and in the children of those categories to which the corresponding user group is associated. Administrators can apply access group visibility to search results. If this capability is used, then only those search results that the user of application program 120 can access are displayed.

Referring to FIG. 1, message analysis engine 140 can be considered to include an analyzing module, instructions, or means to analyze natural language text to identify a set of categories of data in a knowledge base. Application program 120, message analysis engine 140, and/or search engine 150 can be considered to include a providing module, means, or instructions to provide data associated with categories from the knowledge base. Application program 120, message analysis engine 140, and/or search client 152 can be considered to include a presenting module, means or instructions to present the set of categories for selection of a selected category when the set includes more than one category. Application program 120, message analysis engine 140, and/or search engine 150 can also be considered to include another providing module, means, or instructions to provide data associated with the selected category from the knowledge base. Application program 120, message analysis engine 140, and/or search engine 150 can also be considered to include an associating module to associate the selected category with a representation of the natural language text in the knowledge base.

The above-described embodiments can be implemented using a variety of computer systems and architectures. The following section describes an example computing and network environment in which the present invention can be practiced.

An Example Computing and Network Environment

Figure 5:
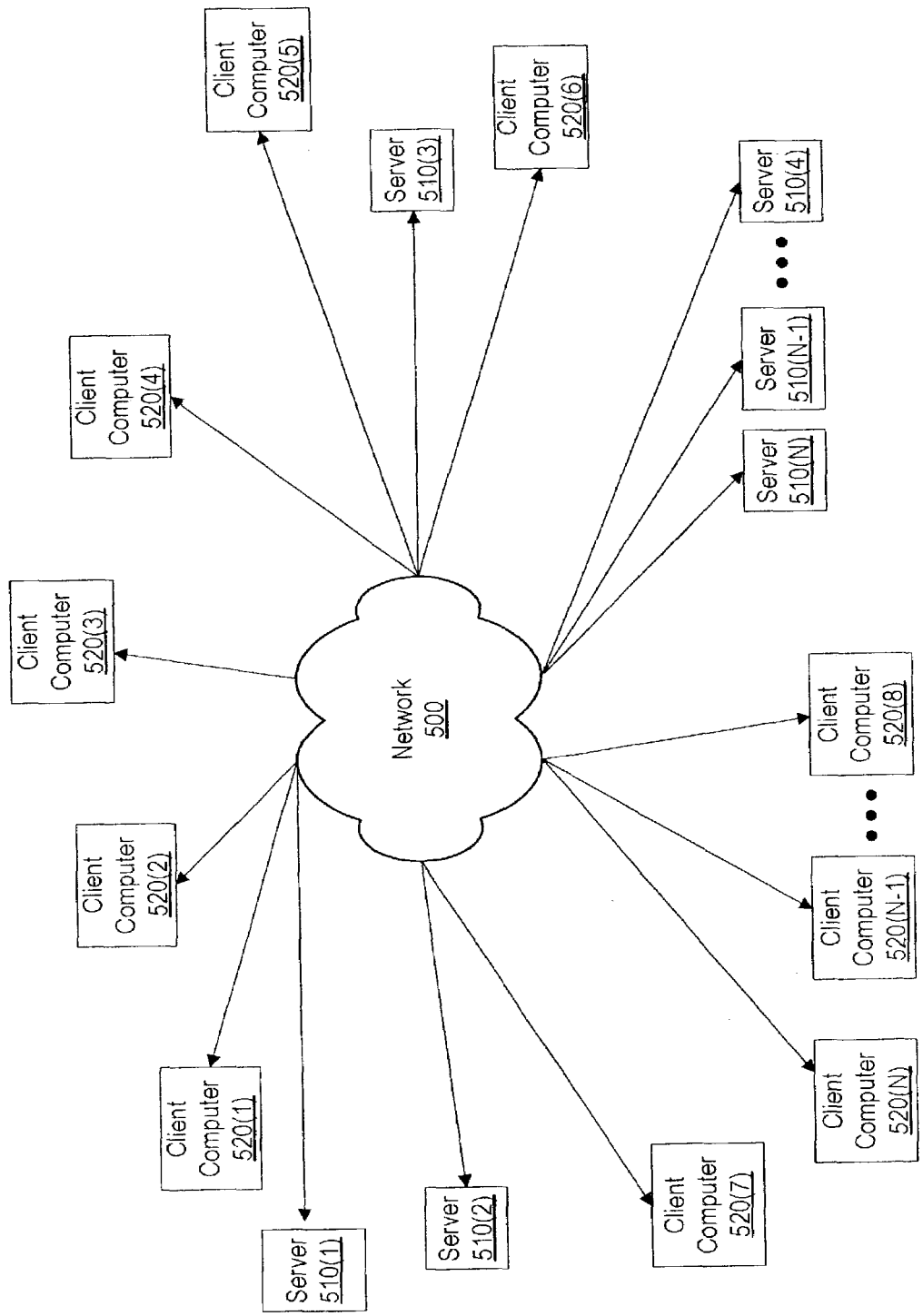
FIG. 5 shows a network environment in which the present invention can operate.

FIG. 5 is a block diagram illustrating a network environment in which a system according to the present invention may be practiced. As is illustrated in FIG. 5, network 500, such as a private wide area network (WAN) or the Internet, includes a number of networked servers 510(1)-(N) that are accessible by client computers 520(1)-(N). Communication between client computers 520(1)-(N) and servers 510(1)-(N) typically occurs over a publicly accessible network, such as a public switched telephone network (PSTN), a DSL connection, a cable modem connection or large bandwidth trunks (e.g., communications channels providing T1 or OC3 service) or wireless link. Client computers 520(1)-(N) access servers 510(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 520(1)-(N).

One or more of client computers 520(1)-(N) and/or one or more of servers 510(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of 110 devices include modems, sound and video devices and specialized communication devices. Mass storage devices such as hard disks, CD-ROM drives and magneto-optical drives may also be provided, either as an integrated or peripheral device. One such example computer system, discussed in terms of client computers 520(1)-(N), is shown in detail in FIG. 6.

Figure 6:
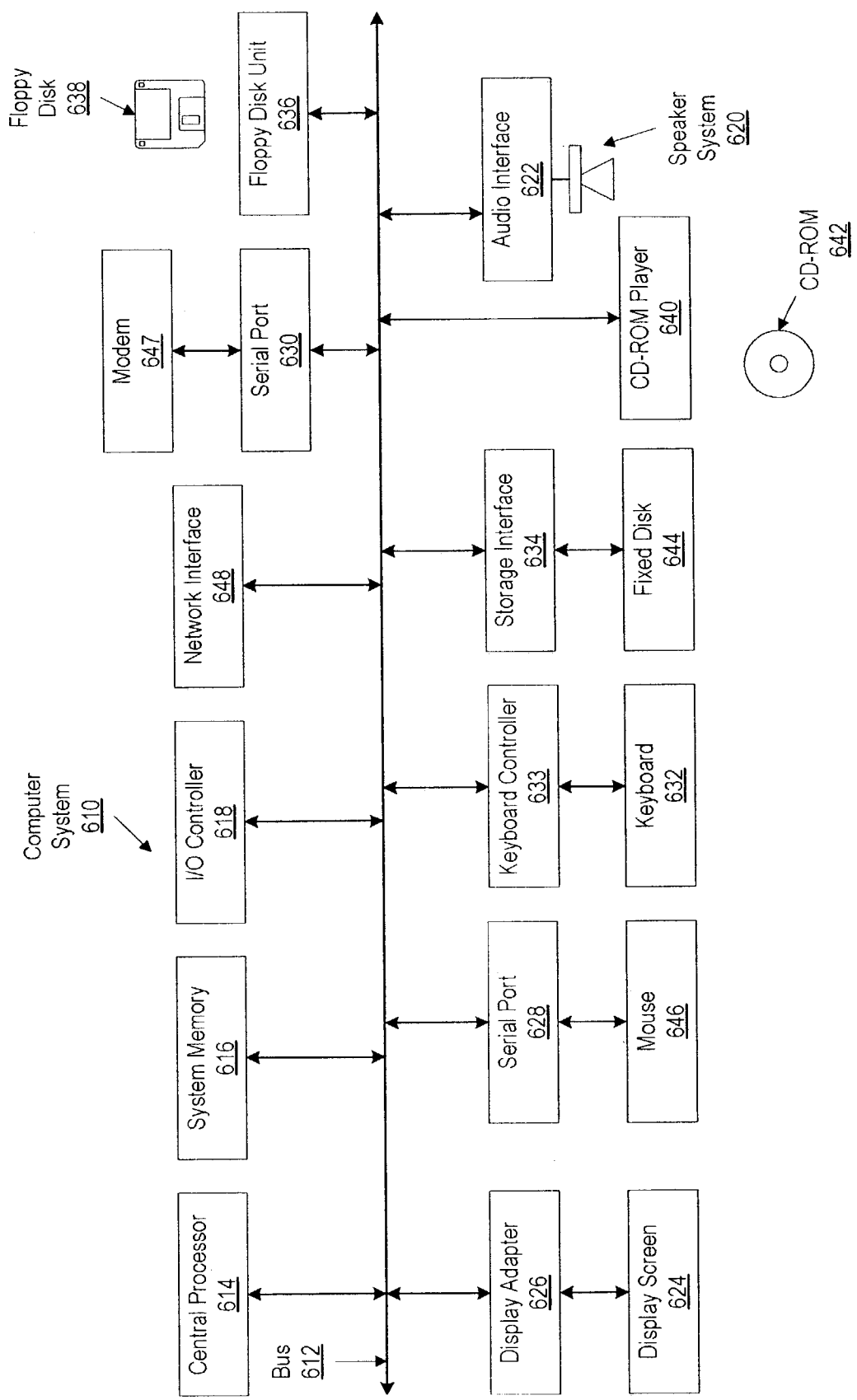
FIG. 6 shows a computer system suitable for implementing the present invention.

FIG. 6 depicts a block diagram of a computer system 610 suitable for implementing the present invention, and example of one or more of client computers 620(1)-(N). Computer system 610 includes a bus 612 which interconnects major subsystems of computer system 610 such as a central processor 614, a system memory 616 (typically RAM, but which may also include ROM, flash RAM, or the like), an input/output controller 618, an external audio device such as a speaker system 620 via an audio output interface 622, an external device such as a display screen 624 via display adapter 626, serial ports 628 and 630, a keyboard 632 (interfaced with a keyboard controller 633), a storage interface 634, a floppy disk drive 636 operative to receive a floppy disk 638, and a CD-ROM drive 640 operative to receive a CD-ROM 642. Also included are a mouse 646 (or other point-and-click device, coupled to bus 612 via serial port 628), a modem 647 (coupled to bus 612 via serial port 630) and a network interface 648 (coupled directly to bus 612).

Bus 612 allows data communication between central processor 614 and system memory 616, which may include both read only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., CD-ROM drive 640), floppy disk unit 636 or other storage medium. Additionally, applications may be in the form of electronic signals modulated in accordance with the application and data communication technology when accessed via network modem 647 or interface 648.

Storage interface 634, as with the other storage interfaces of computer system 610, may connect to a standard computer readable medium for storage and/or retrieval of information, Such as a fixed disk drive 644. Fixed disk drive 644 may be a part of computer system 610 or may be separate and accessed through other interface systems. Many other devices can be connected such as a mouse 646 connected to bus 612 via serial port 628, a modem 647 connected to bus 612 via serial port 630, and a network interface 648 connected directly to bus 612. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, general packet radio service (GPRS) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 6 to be present to practice the present invention. The devices and subsystems may be interconnected in different ways from that shown in FIG. 6. The operation of a computer system such as that shown in FIG. 6 is readily known in the art and is not discussed in detail in this application. Code to implement the present invention may be stored in computer-readable storage media such as one or more of system memory 616, fixed disk 644, CD-ROM 642 or other optical device, or floppy disk 638. Additionally, computer system 610 may be any kind of computing device, and so includes a personal data assistant (PDA), network appliance, X-window terminal or other such computing device. Computer system 610 also supports a number of Internet access tools, including, for example, an HTTP-compliant web browser having a JavaScript interpreter.

Advantages of the present invention are many. Problems can be expressed in natural language text, rather than as a Boolean expression, and queries can be based on natural language messages or on data processed by an application program. The search engine provides intelligence to search based on concepts, rather than solely based on words appearing in both the search query and the search result. The search engine finds documents quickly and presents the results in order of perceived relevance to the search query. Materials of different types can be associated with a common category, so that the form of the knowledge does not interfere with the ability to find the knowledge during a search.

Other Embodiments

The foregoing describes an embodiment wherein some components are contained within other components (e.g., inbound communication manager 130 of application program 120 in FIGS. 1-3). It is to be understood that such depicted architectures are merely examples; in fact, many other architectures can be implemented that achieve the same functionality. Any arrangement of components to achieve the same functionality is effectively "associated" such that the desired functionality is achieved.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs, such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of Computer-readable storage media may be used to store the modules discussed herein.

The above description is intended to be illustrative of the invention and should not be taken to be limiting. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
analyzing natural language text to identity a set of categories of data associated with the natural language text, wherein
the set of categories of data associated with the natural language text are a subset of categories associated with data in a knowledge base,
each category in the knowledge base is associated with a stored text representation of a sample natural language text for the category and a score for the text representation-category combination, and
the score is representative of a relative relevance of the text representation-category combination;
when the set of categories of data associated with the natural language text includes only one category,
automatically providing first data associated with the one category from the knowledge base; and
when the set of categories of data associated with the natural language text includes more than one category,
presenting the set of categories of data associated with the natural language text for selection of a selected category,
providing second data associated with the selected category from the knowledge base, and
modifying the score associated with the text representation-category combination of the selected category using feedback provided upon said selection.

2. The method of claim 1 wherein
the providing the first data comprises:
automatically sending a response to the natural language text, wherein
the response comprises the first data.

3. The method of claim 1 wherein
the providing the second data comprises:
sending a response to the natural language text, wherein
the response comprises the second data.

4. The method of claim 1 wherein
the presenting the set of categories comprises:
providing the text representation-category score for each category.

5. The method of claim 1 wherein
the data in the knowledge base comprise at least one of:
a solution;
a resolution; and
a template.

6. The method of claim 1 wherein
the data in the knowledge base comprise a solution to a problem stated in the natural language text.

7. The method of claim 6 wherein
the solution comprises a plurality of language-specific versions of the solution;
the solution is associated with one category of a plurality of categories; and
each language-specific version of the solution is associated with the one category.

8. The method of claim 1 wherein said providing first data is performed without user selection of the one category from the knowledge base.

9. The method of claim 1 further comprising:
receiving the natural language text from an external message source via a communication manager; and
transmitting the first data or second data using the communication manager.

10. The method of claim 1 further comprising:
analyzing a second natural language text to identify the selected category, wherein
the association of the selected category with the representation of the natural language text is used in said analyzing the second natural language text.

11. An application program interface comprising:
an analyzing function to analyze natural language text to identify a set of categories associated with the natural language text, wherein
the set of categories are a subset of categories associated with data in a knowledge base,
each category in the knowledge base is associated with a stored text representation of a sample natural language text for the category and a score for the text representation-category combination, and
the score is representative of a relative relevance of the text representation-category combination;
a providing function to provide data associated with a category from the knowledge base;
a presenting function to present the set of categories associated with the natural language text for selection of a selected category; and
a modifying function to modify the score associated with the text representation-category combination of the selected category using feedback provided upon said selection.

12. A system comprising:
analyzing means for analyzing natural language text to identify a set of categories of data associated with the natural language text, wherein
the set of categories are a subset of categories associated with data in a knowledge base,
each category in the knowledge base is associated with a stored text representation of a sample natural language text for the category and a score for the text representation-category combination, and
the score is representative of a relative relevance of the text representation-category combination;
first providing means for automatically providing first data associated with one category from the knowledge base, when the set of categories comprises only the one category;
presenting means for presenting the set of categories of data associated with the natural language text for selection of a selected category when the set of categories includes more than one category;
second providing means for providing second data associated with the selected category from the knowledge base; and
modifying means for modifying the score associated with the text representation-category combination of the selected category using feedback provided upon said selection.

13. The system of claim 12 wherein the first providing means comprise:
sending means for automatically sending a response to the natural language text, wherein
the response comprises the first data.

14. The system of claim 12 wherein the second providing means comprise:
sending means for sending a response to the natural language text, wherein
the response comprises the second data.

15. A system comprising:
an analyzing module configured to analyze natural language text to identify a set of categories of data associated with the natural language text, wherein
the set of categories are a subset of categories associated with data in a knowledge base,
each category in the knowledge base is associated with a stored text representation of a sample natural language text for the category and a score for the text representation-category combination, and
the score is representative of a relative relevance of the text representation-category combination;
a first providing module configured to provide first data associated with one category from the knowledge base, when the set of categories of data associated with the natural language text includes only the one category;
a presenting module configured to present the set of categories of data associated with the natural language text for selection of a selected category when the set of categories of data includes more than one category;
a second providing module configured to provide second data associated with the selected category from the knowledge base; and
a modifying module configured to modify the score associated with the text representation-category combination of the selected category using feedback provided upon said selection.

16. The system of claim 15 wherein
the first providing module comprises:
a sending module configured to automatically send a response to the natural language text, wherein
the response comprises the first data.

17. The system of claim 15 wherein
the second providing module comprises:
a sending module configured to send a response to the natural language text, wherein
the response comprises the second data.

18. A computer system comprising:
a processor for executing instructions; and
a memory for storing the instructions, wherein the instructions comprise:
analyzing instructions configured to analyze natural language text to identify a set of categories of data associated with the natural language text, wherein
the set of categories are a subset of categories associated with data in a knowledge base,
each category in the knowledge base is associated with a stored text representation of a sample natural language text for the category and a score for the text representation-category combination, and
the score is representative of a relative relevance of the text representation-category combination;
first providing instructions configured to provide first data associated with one category from the knowledge base, when the set of categories of data includes only the one category;
presenting instructions configured to present the set of categories of data associated with the natural language text for selection of a selected category when the set of categories of data includes more than one category;
second providing instructions configured to provide second data associated with the selected category from the knowledge base; and
modifying instructions configured to modify the score associated with the text representation-category combination of the selected category using feedback provided upon said selection.

19. The computer system of claim 18 wherein
the first providing instructions comprise:
sending instructions configured to automatically send a response to the natural language text, wherein
the response comprises the first data.

20. The computer system of claim 18 wherein
the second providing instructions comprise:
- sending instructions configured to send a response to the natural language text, wherein
  - the response comprises the second data.

21. A computer-readable medium comprising:
- analyzing instructions configured to analyze natural language text to identify a set of categories of data associated with the natural language text, wherein
  - the set of categories are a subset of categories associated with data in a knowledge base,
  - each category in the knowledge base is associated with a stored text representation of a sample natural language text for the category and a score for the text representation-category combination, and
  - the score is representative of a relative relevance of the text representation-category combination;
- first providing instructions configured to provide first data associated with one category from the knowledge base, when the set of categories of data includes only the one category;
- presenting instructions configured to present the set of categories of data associated with the natural language text for selection of a selected category when the set of categories of data includes more than one category;
- second providing instructions configured to provide second data associated with the selected category from the knowledge base; and
- modifying instructions configured to modify the score associated with the text representation-category combination of the selected category using feedback provided upon said selection.

22. The computer-readable medium of claim 21 wherein
the first providing instructions comprise:
- sending instructions configured to automatically send a response to the natural language text, wherein
  - the response comprises the first data.

23. The computer-readable medium of claim 21 wherein
the second providing instructions comprise:
- sending instructions configured to send a response to the natural language text, wherein
  - the response comprises the second data.

\* \* \* \* \*

UNITED STATES PATENT AND TRADEMARK OFFICE
CERTIFICATE OF CORRECTION

PATENT NO. : 7,409,336 B2 Page 1 of 1
APPLICATION NO. : 10/465338
DATED : August 5, 2008
INVENTOR(S) : Pak et al.

It is certified that error appears in the above-identified patent and that said Letters Patent is hereby corrected as shown below:

In column 10, line 63, delete "3114B" and insert -- 314B --, therefor.

In column 12, line 35, after "base" insert -- . --.

In column 13, line 41, delete "110" and insert -- I/O --, therefor.

In column 14, line 21, delete "Such" and insert -- such --, therefor.

In column 15, line 47, delete "Computer-readable" and insert -- computer-readable --, therefor.

In column 15, line 65, in claim 1, delete "identity" and insert -- identify --, therefor.

Signed and Sealed this

Sixteenth Day of March, 2010

David J. Kappos
*Director of the United States Patent and Trademark Office*